(12) United States Patent
Bhandaru et al.

(10) Patent No.: US 11,507,643 B2
(45) Date of Patent: Nov. 22, 2022

(54) LICENSING IN THE CLOUD

(71) Applicant: Intel Corporation, Santa Clara, CA (US)

(72) Inventors: Malini K. Bhandaru, San Jose, CA (US); Kapil Sood, Portland, OR (US); Christian Maciocco, Portland, OR (US); Isaku Yamahata, Urayasu (JP); Yunhong Jiang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 104 days.

(21) Appl. No.: 16/373,300

(22) Filed: Apr. 2, 2019

(65) Prior Publication Data

US 2020/0074047 A1 Mar. 5, 2020

Related U.S. Application Data

(63) Continuation of application No. 14/581,742, filed on Dec. 23, 2014, now Pat. No. 10,289,814.

(51) Int. Cl.
*G06F 21/00* (2013.01)
*G06F 21/10* (2013.01)

(52) U.S. Cl.
CPC .... *G06F 21/105* (2013.01); *G06F 2221/0704* (2013.01); *G06F 2221/0711* (2013.01); *G06F 2221/0773* (2013.01)

(58) Field of Classification Search
CPC ...................................................... G06F 21/34
See application file for complete search history.

(56) References Cited

U.S. PATENT DOCUMENTS

| 8,254,579 | B1 | 8/2012 | Morgan et al. | |
|---|---|---|---|---|
| 10,289,814 | B2 | 5/2019 | Bhandaru et al. | |
| 2005/0251490 | A1* | 11/2005 | Coley | H04L 9/3297 |
| | | | | 705/59 |
| 2006/0200420 | A1 | 9/2006 | Osada | |
| 2007/0256144 | A1 | 11/2007 | Hoffman et al. | |

(Continued)

FOREIGN PATENT DOCUMENTS

| CN | 1625726 | 6/2005 |
|---|---|---|
| CN | 102957666 | 3/2013 |

(Continued)

OTHER PUBLICATIONS

Japanese Office Action from related application JP 2017-077128 dated Apr. 27, 2020, with English translation.

(Continued)

*Primary Examiner* — Jeffrey C Pwu
*Assistant Examiner* — Thong P Truong
(74) *Attorney, Agent, or Firm* — Hanley, Flight & Zimmerman, LLC

(57) ABSTRACT

At least one machine readable medium comprising a plurality of instructions that in response to being executed by a system cause the system to send a unique identifier to a license server, establish a secure channel based on the unique identifier, request a license for activating an appliance from a license server over the secure channel, receive license data from the license server over the secure channel; determine whether the license is valid, and activate the appliance in response to a determination that the license data is valid.

21 Claims, 5 Drawing Sheets

(56) References Cited

U.S. PATENT DOCUMENTS

| | | |
|---|---|---|
| 2012/0047205 A1 | 2/2012 | Yamamoto et al. |
| 2012/0127490 A1 | 5/2012 | Ogasawara et al. |
| 2012/0151574 A1 | 6/2012 | Zhang et al. |
| 2014/0189346 A1* | 7/2014 | Cureton ............. G06F 21/31 713/155 |
| 2014/0230024 A1 | 8/2014 | Uehara et al. |
| 2014/0283090 A1 | 9/2014 | Angelov et al. |
| 2015/0020069 A1* | 1/2015 | Patani ............. G06F 9/45533 718/1 |
| 2015/0089502 A1 | 3/2015 | Horovitz et al. |
| 2015/0220927 A1 | 8/2015 | Smith et al. |
| 2016/0180063 A1 | 6/2016 | Bhandaru et al. |

FOREIGN PATENT DOCUMENTS

| | | |
|---|---|---|
| CN | 105718760 | 6/2016 |
| CN | 105718760 | 11/2018 |
| DE | 102015118886 | 6/2016 |
| EP | 2746978 | 6/2014 |
| JP | 2004135021 | 4/2004 |
| JP | 2006235963 | 9/2006 |
| JP | 2012113496 | 6/2012 |
| JP | 2014501966 | 1/2014 |
| JP | 2014507736 | 3/2014 |
| JP | 2016119068 | 6/2016 |
| JP | 6135022 | 5/2017 |
| JP | 2017152017 | 8/2017 |
| JP | 6740166 | 7/2020 |
| WO | 2012126506 | 9/2012 |

OTHER PUBLICATIONS

"Japanese Application Serial No. 2017-077128, Notification of Reasons for Refusal dated Jan. 27, 2020", w English Translation, 11 pgs.

"U.S. Appl. No. 14/581,742, Non Final Office Action dated Mar. 31, 2017", 25 pgs.

"U.S. Appl. No. 14/581,742, Response filed Jul. 28, 2017 to Non Final Office Action dated Mar. 31, 2017", 13 pgs.

"U.S. Appl. No. 14/581,742, Final Office Action dated Nov. 1, 2017", 19 pgs.

"U.S. Appl. No. 14/581,742, Examiner Interview Summary dated Feb. 7, 2018", 3 pgs.

"U.S. Appl. No. 14/581,742, Response filed Apr. 24, 2018 to Final Office Action dated Nov. 1, 2017", 11 pgs.

"U.S. Appl. No. 14/581,742, Non Final Office Action dated Jun. 29, 2018", 20 pgs.

"U.S. Appl. No. 14/581,742, Response filed Oct. 1, 2018 to Non Final Office Action dated Jun. 29, 2018", 15 pgs.

"U.S. Appl. No. 14/581,742, Notice of Allowance dated Jan. 3, 2019", 5 pgs.

"Japanese Application Serial No. 2015-226541, Notice of Reasons for Refusal dated Nov. 15, 2016", w English Translation, 16 pgs.

"Chinese Application Serial No. 201510817595.4, Office Action dated Feb. 9, 2018", w o English Translation, 8 pgs.

"Chinese Application Serial No. 201510817595.4, Response filed Jun. 25, 2018 to Office Action dated Feb. 9, 2018", w o English Translation, 12 pgs.

"Japanese Application Serial No. 2015-226541, Response filed Feb. 13, 2017 to Notice of Reasons for Refusal dated Nov. 15, 2016", w English Translation, 27 pgs.

"Trusted platform module", Wikipedia, (Nov. 10, 2014), 9 pgs.

"German Application Serial No. 102015118886.4, Office Action dated Nov. 30, 2020", w Concise Statement of Relevance, 10 pgs.

The State Intellectual Property Office of People's Republic of China, "Notice of Allowance," issued in connection with Chinese Application No. 201510817595.4, dated Aug. 2, 2018, with English translation, 3 pages.

Japanese Patent Office, "Decision to Grant Patent," issued in connection with Japanese Application No. 2015-226541, dated Feb. 28, 2017, with English translation, 5 pages.

Japanese Patent Office, "Decision to Grant Patent," issued in connection with Japanese Application No. 2017-077128, dated May 26, 2020, with English translation, 5 pages.

* cited by examiner

LICENSING IN THE CLOUD

TECHNICAL FIELD

The disclosed technology relates generally to licensing cloud software and, more particularly, to licensing cloud software using a secure, hardened license mechanism.

BACKGROUND

With the advent of virtualization and cloud infrastructures, platforms, and software as service deployment, licensed applications and services that were traditionally hardware based, such as firewalls, load balancers, wide area network optimizers, etc., are being deployed as virtual machines (VMs). Network function virtualization will offer savings in cost by allowing the use of common-off-the-shelf hardware in a cloud infrastructure and speed innovation because it is easier to introduce new features into the software without having to wait for a new hardware release cycle. Currently available licensing solutions are proprietary, not designed for the cloud, and are not rooted in hardware, which provides greater security.

BRIEF DESCRIPTION OF THE DRAWINGS

Embodiments of the disclosed technology are illustrated by way of example, and not by way of limitation, in the drawings and in which like reference numerals refer to similar elements.

DETAILED DESCRIPTION

As used herein, appliances and virtual network functions (VNF) are used to refer to licensed applications and services interchangeably. Embodiments of the disclosed technology roots licensing in hardware by the use of Intel Software Guard Extensions (SGX) technology or other Trusted Execution Engines (TEE), as will be discussed in more detail below. These will be referred to as SEC, for security device, herein. SEC may refer to either SGX or TEE.

Figure 1:
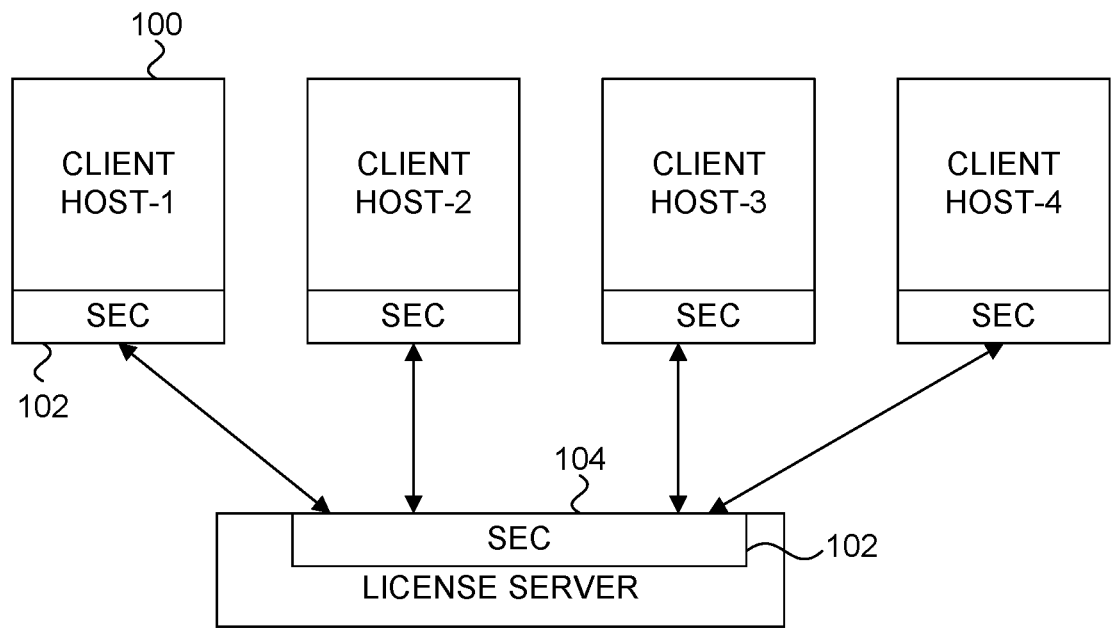
FIG. 1 illustrates a license management system in the context of a cloud, where the appliance or Virtual Network Function may be running either on a bare metal machine or on a hypervisor.
Figure 2:
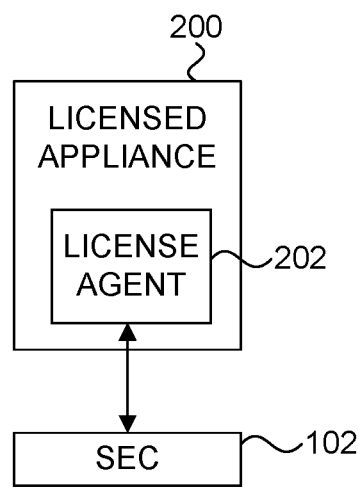
FIG. 2 illustrates a licensed appliance with a license agent located on a client host.

As discussed above, FIG. 1 illustrates a license management system in the context of a cloud environment, where the VNF may be running either on a bare metal machine, a container, or on a hypervisor. The cloud environment may include a variety of client hosts 100, each client host including an SEC 102 in hardware. Each SEC 102 includes license key data that is unique to each SEC and stored within the SEC 102. FIG. 2 illustrates a licensed appliance 200, or VNF, that may be located on each client-host 100. The licensed appliance 200 includes a license agent 202 that is in communication with the SEC 102.

The license agent 202 may securely communicate with the license server to verify licenses through SECs 102. That is, the license agent 202 may communicate with the SEC 102 on the client host 100, which then securely communicates with the SEC 102 on the license server 104 using the secure license key data.

As mentioned above, the license key data is unique to each SEC 102 and protects the license and the key data itself from tampering. The appliance 200 may only be activated after the license agent 202 ascertains that the license is valid, as will be discussed in more detail below with respect to FIG. 4.

Figure 3:
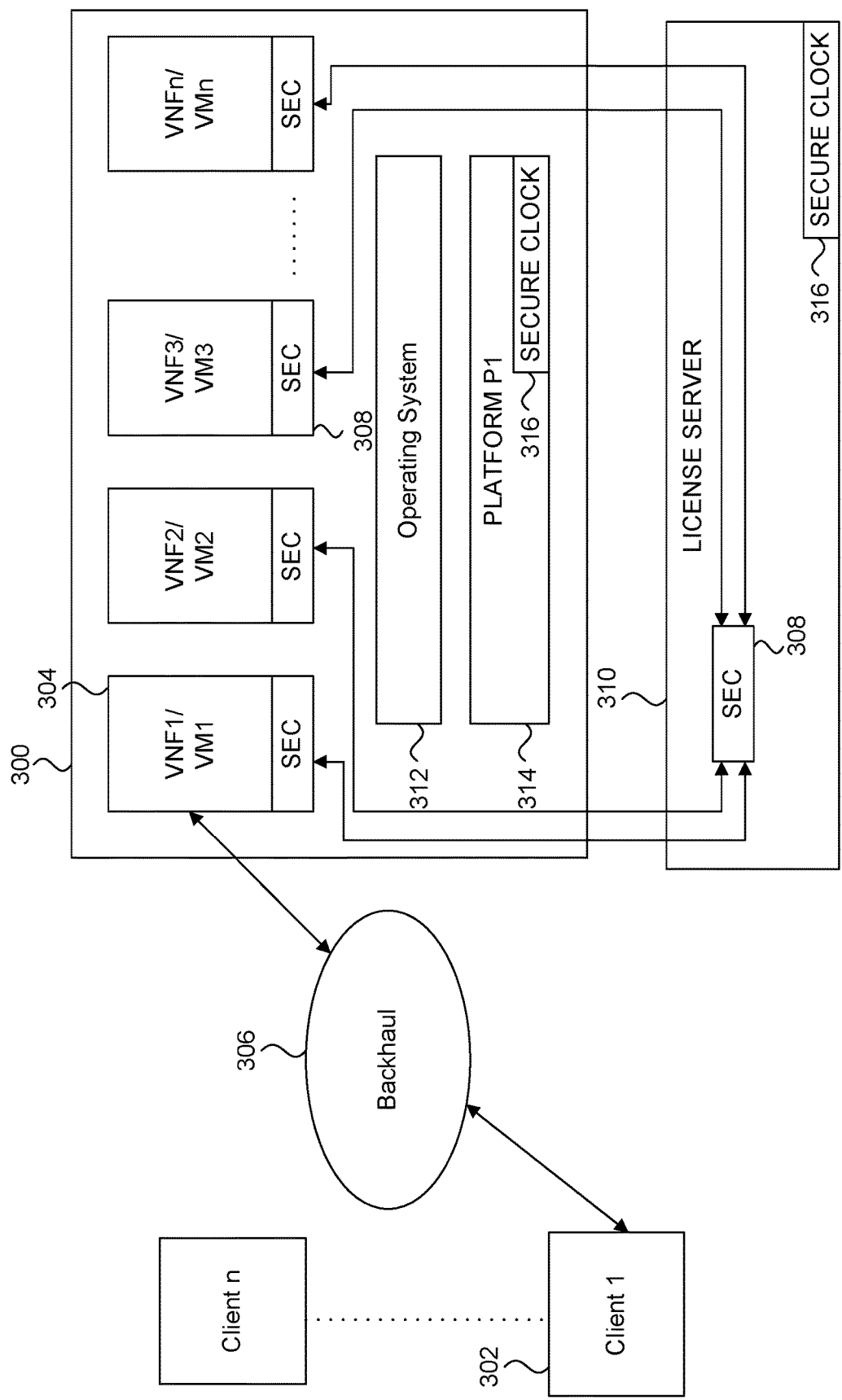
FIG. 3 illustrates a virtualized environment using a secure, hardened license mechanism.

FIG. 3 illustrates a license management system running in a cloud virtualized environment. The license management system, however, may also run on a bare metal machine or in a container, as discussed above. The embodiment of FIG. 3 includes clients 302 that connect to the VNF/VM 304 in a cloud virtualized environment 300 through a backhaul 306. A hypervisor hosts one or more VNFs and will be referred to together as VNF/VMs 304 herein. Clients 302 may also be referred to as cloud tenants. The backhaul 306 may be any portion of a network between the cloud virtualized environment and clients. The SEC 308 in each of the VNF/VMs 304 is in communication with a license server system 310 that also includes an SEC 308. The cloud virtualized environment 300 may include a hypervisor or a cloud operating system (OS) 312, such as OpenStack, and a platform 314. For ease of discussion, hypervisor or cloud OS 312 will be referred to as cloud OS 312 below. However, as will be readily understood by one skilled in the art, either a hypervisor, cloud OS, or equivalent system may be used. Each physical compute host supporting the cloud virtualized environment 300 has one platform 314, and each platform 314 includes a secure clock 316. Each physical compute host supporting the license server also has an SEC 308 and a secure clock 316. Since the SEC 308 has access to the secure clock 316, it reduces the incidents of time manipulation attacks, as also discussed in more detail below with respect to FIGS. 4 and 5.

Figure 4:
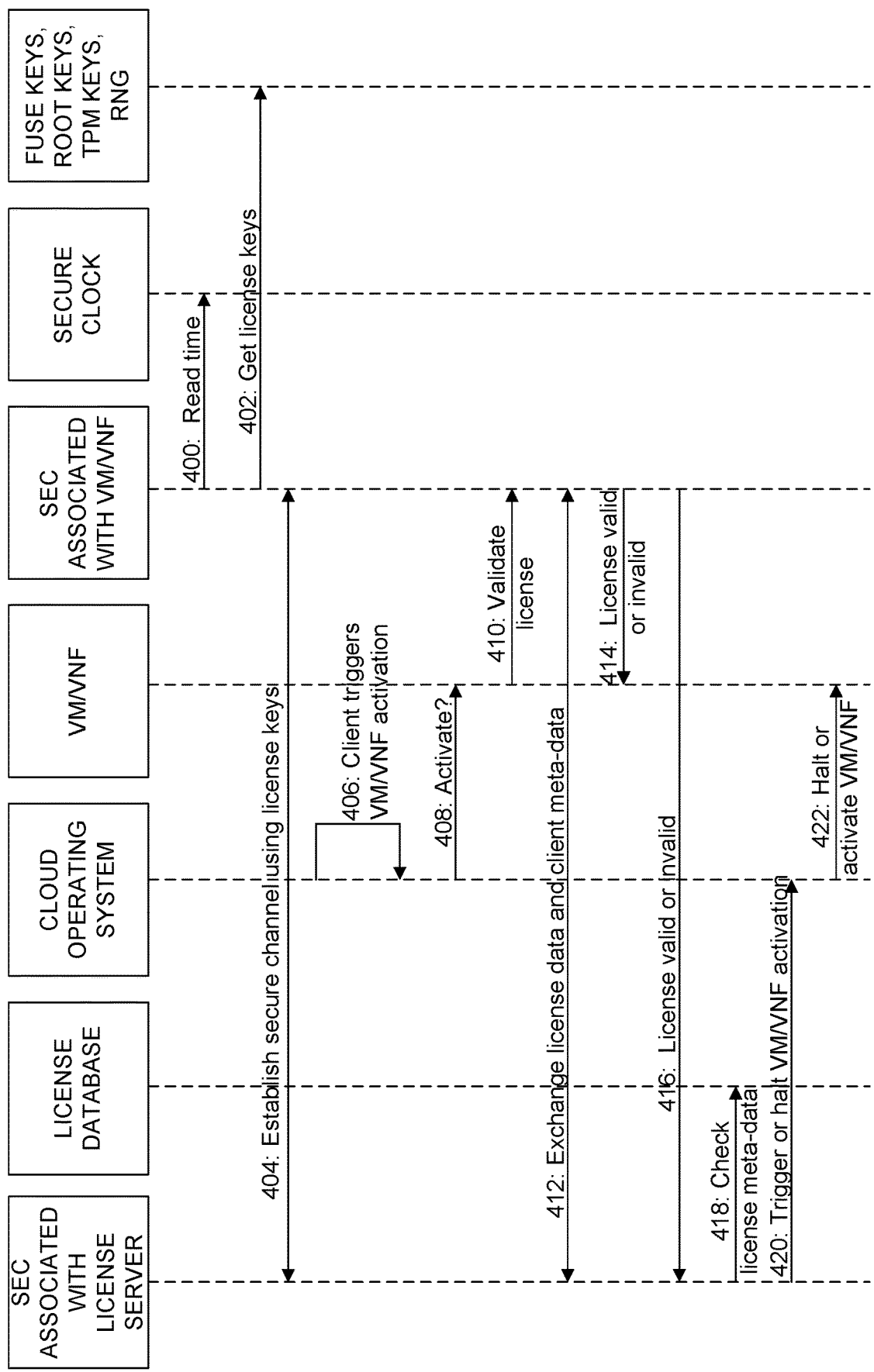
FIG. 4 illustrates a high level flow of an embodiment of the disclosed technology.

FIG. 4 illustrates an example high-level flow of some embodiments of the disclosed technology to activate a VNF on a VM with a license. Although FIG. 4 illustrates the cloud OS performing various operations, the cloud OS may focus on launching VMs and delegate the task of obtaining and renewing a license to the VNF. The high-level flow illustrated in FIG. 4 may be used across all independent software vendors (ISVs) and cloud operating systems that would like to get assurance via valid licensing. In operation 400, the SEC in each VM reads the time from the secure clock. The SEC also may use a platform or silicon based Random Number Generator for key entropy and as seed for detecting session replay. A hardware random number generator provides a rich stream of randomness, useful particularly in the license server, for the nonce generation, setting up secure communication channel, etc. This is particularly useful in the cloud where traditional sources of entropy such as mouse movements and keyboard strokes are not available. In operation 402, the license agent retrieves the keys in the SEC associated with the VM, which may be fuse keys, root keys, or trusted platform module (TPM) keys, to create a secure channel with the license server. In operation 404, the keys retrieved by the license agent are sent via the SEC associated with the VM/VNF to the SEC associated with the license server. This establishes a secure channel between the VM/VNF and the license server and assures protection of the license from unauthorized exposure and replication outside of the secure channel, since each SEC has its own unique set of keys.

In operation 406, a client triggers the VM/VNF activation at the cloud OS. Upon the client request for activation, in operation 408, the cloud OS sends a request to the VM/VNF to activate if the license is valid. However, as mentioned above, the VNF may send the request for activation or for license renewal periodically or at startup. In turn, the VM/VNF sends the license data, which may include client metadata, of the client to the SEC associated with the VM/VNF, as discussed in more detail below with respect to FIG. 5. In operation 410, the VM/VNF requests the SEC to validate the license. Then, in operations 412, on the secure channel established between the SEC associated with the VM/VNF and the SEC associated with the license server, the license data, including the client metadata, is exchanged and the SEC associated with the VM/VNF determines if the license is valid. In operation 414, the SEC associated with the VM/VNF notifies the SEC associated with the license server whether the license was valid or invalid. In operation 416, the SEC associated with the VM/VNF also notifies the SEC associated with the license server whether the license is valid or invalid. In operation 418, the license data, which may include client metadata, is also checked against the license data saved in the license database.

Based on the validity of the license, the SEC associated with the license server will either trigger activation of the VM/VNF on the cloud OS, or halt activation of the VM/VNF on the cloud OS in operation 420. The cloud OS then activates or halts the VM/VNF based on the trigger received from the SEC associated with the license server in operation 422.

A VNF may fail to launch and notify a client, or cloud tenant, of an issue. The cloud OS may also be alerted of this failure so some corrective action can be taken, such as informing a cloud tenant if the license dues are not paid, or the cloud provider acquire more licenses given their usage has increased. The cloud OS may also pause the VNF and re-coup resources and re-allocate, depending on the circumstances.

In an alternative embodiment, the license validation on every platform may be added by extending the scheme of FIG. 4. A SEC for each platform will sign a license attestation blob, which comprises the software ID, mac-address, hostname or the platform system ID, a secure time value, Random Number, etc., and this is also delivered to the SEC associated with the license server.

In an alternative embodiment, a license authorization during a migration of VMs/VNFs can be transparently handled by the network of SECs when a VM is migrated. In such a case, the license activation is triggered by the cloud OS at the same time that the cloud OS is enacting the VM/VNF migration. A license server aware cloud may transmit a secure message to the license server indicating a VM migration event. The cloud OS would be aware if a special VM launch is used, as in the case of service-VMs (e.g., fire-walls, load-balancers, etc.). Since the SEC has different and unique keys that are never exposed outside the SEC, the license server will assume no unauthorized use of those credentials. Hence, each SEC associated with each VM/VNF has a unique communication connection with the SEC license server, and the license attestation is protected by non-repudiation.

Figure 5:
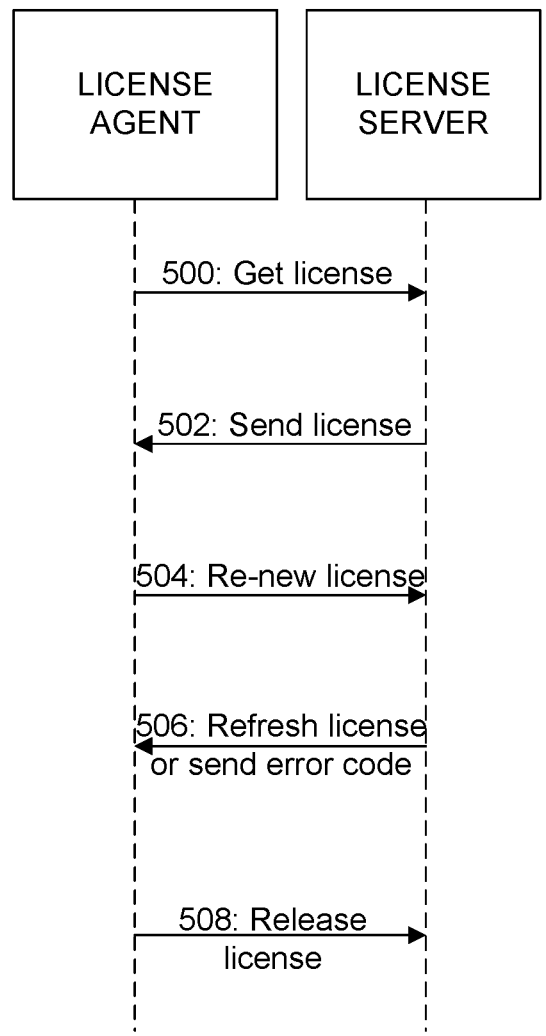
FIG. 5 illustrates messages between a license agent and a license server.

FIG. 5 illustrates messaging between the license agent and the license server. In the background, the license server continually harvests licenses that have not been refreshed for a number of consecutive refresh periods. The license server may also generate signed audit logs at the end of each day, along with statistics, such as licenses concurrently used, typical duration of use, and the number of failed license requests. That is, the license server checks, validates and fixes its status in the background in case of a message loss or reorder. For example, if a message of license release is lost, the license is considered occupied or as used. In the background the license server may periodically check dangling licenses, and if the number of licenses reaches its quota, the licensing server attempts to collect the dangling licenses and release the dangling licenses for the convenience of clients.

In operation 500, the license agent requests, via an associated SEC, a license from the license server. This involves sending the metadata of the client host, such as the MAC-address, host-name, IP-address and time of the client to the license server using a secure clock. This information is transmitted securely through the SEC, as discussed above. In operation 502, the license server creates the license using the metadata of the client and sends the license to the license agent. The license includes the expiration time based on the client time and a lease period, as well as an expiration time based on the server time and the lease period. The license also includes the host-name, MAC-address, and IP-address of the client, as well as the server-time-stamp. The license is saved in the license database, then signed with an attached certificate and issued to the license agent. When the license agent receives the license in operation 502, it validates the license signature and caches the license in the SEC associated with the license agent. As long as the client expire time is less than the actual client time, the license is valid and may be used by the client.

That is, license validation is performed via the SECs by comparing the expiration timestamp as captured in the license with the secure clock-based timestamp on the local server and the secure timestamp provided by the VM seeking validation. If no secure timestamp can be established by the VM and/or the license server, then a timestamp as established on the license server using Network Time Protocol is used. The license server is generally more trusted than individual compute nodes and the VMs running on the compute nodes.

The license agent periodically verifies that the appliance can be used with the cached license by running a daemon process that checks that the expiration time has not passed the local secure clock and sends a keep-alive message, or re-new message, to the license server. In the absence of a license refresh response after a number of check periods from the license server, the license agent will instruct the VM to shut down the appliance.

In operation 504, a license renew request is sent from the license agent to the license server, as discussed above. If the license metadata matches the license data stored in the license database, and the license has not yet expired, then the license is renewed. If the license has expired, then a return expired message is sent to the license agent, the license is harvested, and the licensed-ID is disabled. If the license metadata and/or signature do not match that stored in the license database, then it is possible a clone or migration of a VM is attempting to use the license. During a clean VM migration, as discussed above, the license server is informed and the license is harvested and re-issued on a request from a new client host. Either the license-refresh or an error code is sent to the license agent in operation 506. All requests, responses, and errors are logged by the license server and may be saved in the license database.

If the license agent receives an error message, then a new license may be requested in operation 500. Otherwise, the license refresh is verified and the refresh time is updated at the license agent. When the license has expired, then in operation 508, the license is released from the license agent and the license is removed from the cache of the SEC associated with the license agent and the license is harvested at the license server and the event is logged.

When a VM is paused, stopped, or migrated, the license agent triggers a license harvesting event that includes clearing the local cache of the license and issues a message to the license server to release the license. This allows the maximum amount of license uses with floating licenses.

A VM/VNF, or appliance, may be cloned in a variety of ways. On launch of the clone, the administrator has the option to request a new MAC-address or re-use the MAC-address of the original VM/VNF. The above disclosed embodiments insulate from the misuse of licenses by denying any license renew requests from clones since they will not match in either the MAC-address, IP-address, hostname, and/or SEC signature. The clone may then request a new license, and if any licenses are available, a new license may be issued.

To prevent license spoofing, each time a VM/VNF is launched, either on first start-up, post migration to a new client host, or on re-activation after a pause, the VM/VNF must contact the license server. On hardware that has SGX and/or TEE capability, the messages are signed by host-specific keys, as discussed above. Clones will not match the original requested and issued license keys.

In the absence of hardware that has SGX and/or TEE capability, if two or more VM/VNFs present with the same host-name and MAC-address combination, or the refresh timestamp at the server is sooner than expected, the license refresh will be denied with a message code of "possible-clone." This will protect the original VM/VNF from denial of service yet denies clones of the service. This, however, will also deny any VM/VNF that was migrated to a new client host. Upon receiving the "possible-clone" message, the VM/VNF must issue a get-license message, as shown above in operation 500 of FIG. 5.

Figure 6:
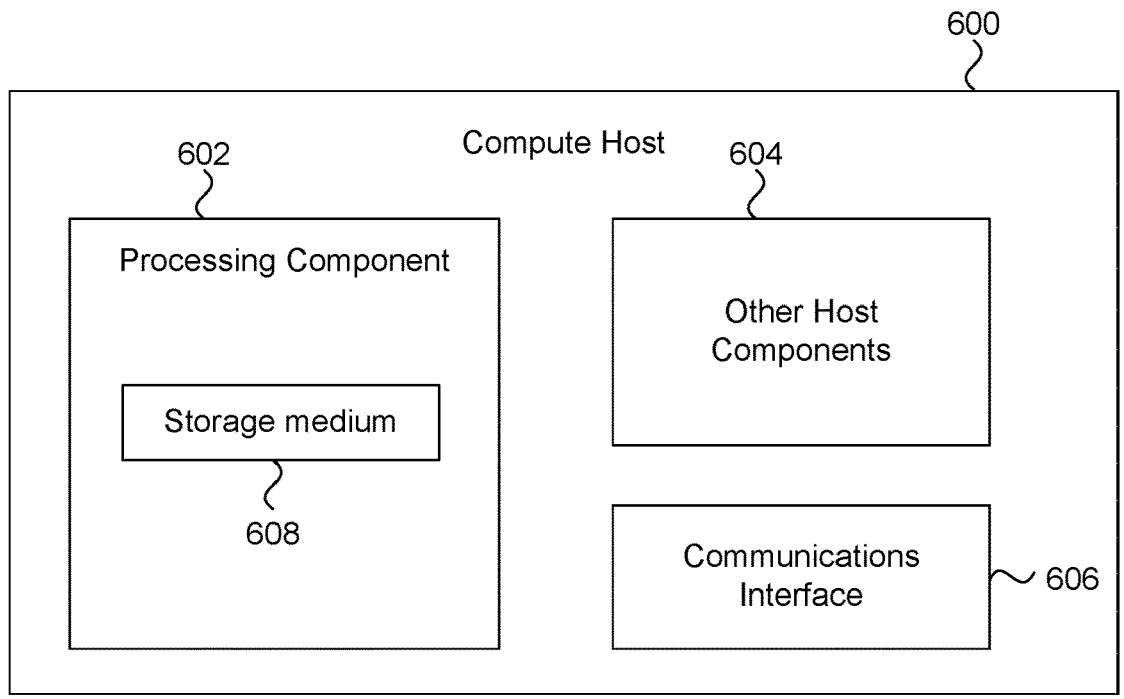
FIG. 6 illustrates an example computing device suitable for practicing the present disclosure, in accordance with various embodiments.

FIG. 6 illustrates an example compute host 600. In some examples, as shown in FIG. 6, compute host 600 may include a processing component 602, other host components 604 or a communications interface 606. According to some examples, compute host 600 may be the client host 100 or license server 102 associated with FIG. 1 or platform 314 and license server 310 associated with FIG. 3. Compute host 600 may either be a single physical server or a composed logical server that includes combinations of disaggregate components or elements composed from a shared pool of configurable computing resources.

According to some examples, processing component 602 may execute processing operations or logic for storage medium 608. Processing component 602 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other host components 604 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 606 may include logic and/or features to support a communication interface. For these examples, communications interface 606 may include one or more communication interfaces that operate according to various communication protocols or standards to communicate over direct or network communication links. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Hardware Abstraction API Specification. Network communications may also occur according to the Infiniband Architecture specification or the TCP/IP protocol.

As mentioned above compute host 600 may be implemented in a single server or a logical server made up of composed disaggregate components or elements for a shared pool of configurable computing resources. Accordingly, functions and/or specific configurations of compute host 600 described herein, may be included or omitted in various embodiments of compute host 600, as suitably desired for a physical or logical server.

The components and features of compute host 600 may be implemented using any combination of discrete circuitry, application specific integrated circuits (ASICs), logic gates and/or single chip architectures. Further, the features of compute host 600 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary compute host 600 shown in the block diagram of FIG. 6 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 7:
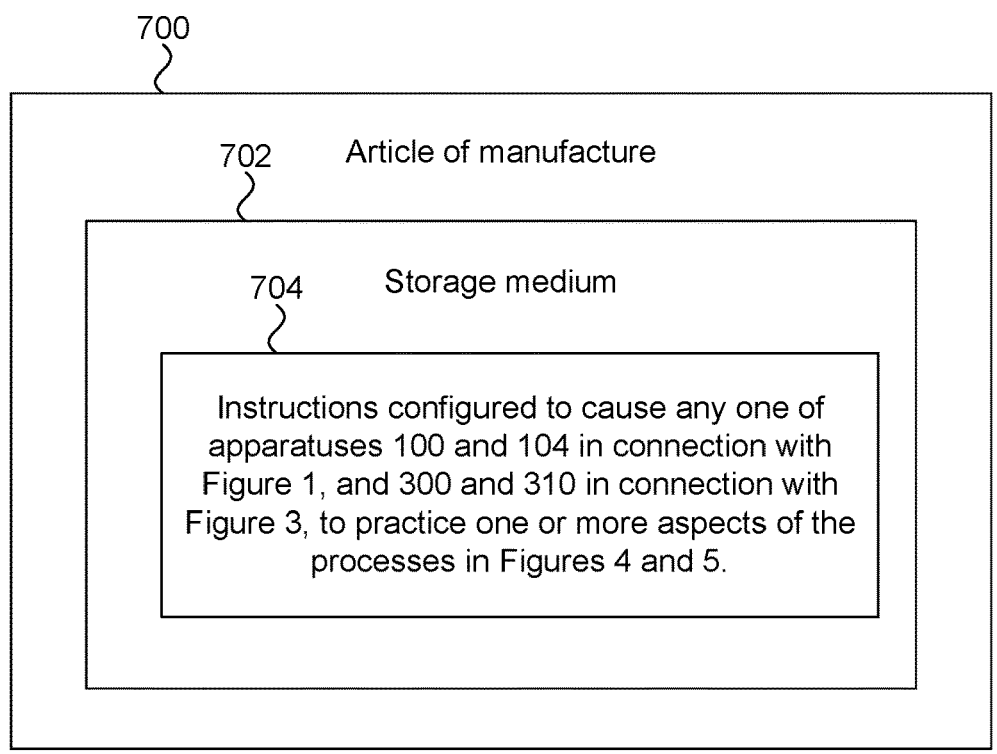
FIG. 7 illustrates an article of manufacture having programming instructions, incorporating aspects of the present disclosure, in accordance with various embodiments.

Some examples may include an article of manufacture or at least one computer-readable medium, as seen in FIG. 7. FIG. 7 illustrates an article of manufacture 700 having programming instructions, incorporating aspects of the present disclosure, in accordance with various embodiments. In various embodiments, an article of manufacture may be employed to implement various embodiments of the present disclosure. As shown, the article of manufacture 700 may include a computer-readable non-transitory storage medium 702 where instructions 704 are configured to practice embodiments of or aspects of embodiments of any one of the processes described herein. The storage medium 702 may represent a broad range of persistent storage media known in the art, including but not limited to flash memory, dynamic random access memory, static random access memory, an optical disk, a magnetic disk, etc. Instructions 704 may enable an apparatus, in response to their execution by the apparatus, to perform various operations described herein. As an example, storage medium 702 may include instructions 704 configured to cause an apparatus, e.g., client host 100 or license server 102 associated with FIG. 1 or platform 314 and license server 310 associated with FIG. 3, to practice some aspects of licensing appliances, as illustrated in process of FIG. 4, in accordance with embodiments of the present disclosure. As another example, storage medium 702 may include instructions 704 configured to cause an apparatus, e.g., client host 100 or license server 102 associated with FIG. 1 or platform 314 and license server 310 associated with FIG. 3, to practice some aspects of licensing appliances, as illustrated in process of FIG. 5, in accordance with embodiments of the present disclosure. In embodiments, computer-readable storage medium 702 may include one or more computer-readable non-transitory storage media. In other embodiments, computer-readable storage medium 702 may be transitory, such as signals, encoded with instructions 704.

A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1. A machine-controlled method for licensing an appliance on a machine, the method comprising: sending a unique identifier to a license server; establishing a secure channel based on the unique identifier; requesting a license for activating the appliance from the license server over the secure channel; receiving license data from the license server over the secure channel; determining whether the license is valid; and activating the appliance in response to a determination that the license data is valid.

Example 2. The machine-controlled method of example 1, wherein the secure channel is established using a security device associated with the machine that generates the unique identifier.

Example 3. The machine-controlled method of example 2, wherein the security device includes software guard extension hardware or a trusted execution engine.

Example 4. The machine-controlled method of example 1, further comprising storing the license data in a memory associated with the machine.

Example 5. The machine-controlled method of example 4, wherein the license data includes an expiration time and one of a MAC-address, IP-address, and host name of the machine.

Example 6. The machine-controlled method of example 5, further comprising deactivating the appliance if a machine time is after the expiration time.

Example 7. The machine-controlled method of example 5, further comprising: determining a machine time based on a secure clock located on the machine; and deactivating the appliance if the machine time is after the expiration time.

Example 8. The machine-controlled method of example 1, further comprising: requesting a license renewal after a predetermined period of time; receiving a license renewal response; and deactivating the appliance if the license renewal is invalid.

Example 9. At least one machine readable medium comprising a plurality of instructions that in response to being executed by a system cause the system to: send a unique identifier to a license server; establish a secure channel based on the unique identifier; request a license for activating an appliance from a license server over the secure channel; receive license data from the license server over the secure channel; determine whether the license is valid; and activate the appliance in response to a determination that the license data is valid.

Example 10. The at least one machine readable medium of example 9, wherein the secure channel is established using a security device associated with the machine that generates the unique identifier.

Example 11. The at least one machine readable medium of example 10, wherein the security device includes software guard extension hardware or a trusted execution engine.

Example 12. The at least one machine readable medium of example 9, comprising the instructions to further cause the system to store the license data in a memory associated with the machine.

Example 13. The at least one machine readable medium of example 12, wherein the license data includes an expiration time and one of a MAC-address, IP-address, and host name of the machine.

Example 14. The at least one machine readable medium of example 13, comprising the instructions to further cause the system to deactivate the appliance if a machine time is after the expiration time.

Example 15. The at least one machine readable medium of example 13, comprising the instructions to further cause the system to: determine a machine time based on a secure clock located on the machine; and deactivate the appliance if the machine time is after the expiration time.

Example 16. The at least one machine readable medium of example 9, comprising the instructions to further cause the system to: request a license renewal after a predetermined period of time; receive a license renewal response; and deactivate the appliance if the license renewal is invalid.

Example 17. A machine for running an appliance, the machine comprising: a security device configured to generate a unique identifier; and a processor configured to: receive the unique identifier from the security device, send the unique identifier to a license server, establish a secure channel based on the unique identifier, request a license for activating the appliance from the license server over the secure channel, receive license data from the license server over the secure channel, determine whether the license is valid, and activate the appliance in response to a determination that the license data is valid.

Example 18. The machine of example 17, wherein the security device includes software guard extension hardware or a trusted execution engine.

Example 19. The machine of example 17, further comprising a memory configured to store the license data.

Example 20. The machine of example 17, wherein the license data includes an expiration time and one of a MAC-address, IP-address, and host name of a machine operating the machine.

Example 21. The machine of example 17, further comprising a secure clock, wherein the processor is further configured to receive a machine time from the secure clock and deactivate the appliance if the machine time is after the expiration time.

Example 22. The machine of example 17, wherein the processor is further configured to: receive a license renewal request from the machine; determine a license renewal response based on the license data stored in the license database; and send a license renewal response.

Example 23. The machine of example 22, wherein the license renewal response includes a new license.

Example 24. The machine of example 22, wherein the license renewal response includes a message indicating the license is invalid.

Example 25. A machine-controlled method for providing license information from a license server to a machine, the method comprising: sending a unique identifier to the machine; establishing a secure channel based on the unique identifier; receiving a request for a license over a secure channel; receiving metadata from the machine; generating license data based on the metadata; and sending the license data to the machine.

Example 26. The machine-controlled method of example 25, wherein the secure channel is established using a security device associated with the license server that generates the unique identifier.

Example 27. The machine-controlled method of example 26, wherein the security device includes software guard extension hardware or a trusted execution engine.

Example 28. The machine-controlled method of example 25, further comprising storing the license data in a license database.

Example 29. The machine-controlled method of example 25, wherein the license data includes an expiration time and the received metadata.

Example 30. The machine-controlled method of example 29, wherein the metadata includes a MAC-address, IP-address, and host name of a machine operating the machine.

Example 31. The machine-controlled method of example 28, further comprising determining if the license is valid based on the license data stored in the license database and the received metadata.

Example 32. The machine-controlled method of example 31, further comprising: receiving a license renewal request from the machine; determining a license renewal response based on the validity of the license data stored in the license database; and sending a license renewal response.

Example 33. The machine-controlled method of example 32, wherein the license renewal response includes a new license.

Example 34. The machine-controlled method of example 33, wherein the license renewal response includes a message indicating a license is not valid.

Example 35. At least one machine readable medium comprising a plurality of instructions that in response to being executed by a system cause the system to: send a unique identifier to the machine; establish a secure channel based on the unique identifier; receive a request for a license over a secure channel; receive metadata from the machine; generate license data based on the metadata; and send the license data to the machine.

Example 36. The at least one machine readable medium of example 35, wherein the secure channel is established using a security device associated with the license server that generates the unique identifier.

Example 37. The at least one machine readable medium of example 36, wherein the security device includes software guard extension hardware or a trusted execution engine.

Example 38. The at least one machine readable medium of example 35, comprising the instructions to further cause the system to store the license data in a license database.

Example 39. The at least one machine readable medium of example 35, wherein the license data includes an expiration time and the received metadata.

Example 40. The at least one machine readable medium of example 39, wherein the metadata includes a MAC-address, IP-address, and host name of a machine operating the machine.

Example 41. The at least one machine readable medium of example 38, comprising the instructions to further cause the system to determine if the license is valid based on the license stored in the license database and the received metadata.

Example 42. The at least one machine readable medium of example 41, comprising the instructions to further cause the system to: receive a license renewal request from the machine; determine a license renewal response based on the validity of the license data stored in the license database; and send a license renewal response.

Example 43. The at least one machine readable medium of example 42, wherein the license renewal response includes a new license.

Example 44. The at least one machine readable medium of example 42, wherein the license renewal response includes a message indicating a license is not valid.

Example 45. A license server, including: a security device configured to generate a unique identifier; and a processor configured to: send the unique identifier to a machine, establish a secure channel based on the unique identifier, receive a request for a license over a secure channel, receive metadata from the machine, generate license data based on the metadata, and send the license data to the machine.

Example 46. The license server of example 45, wherein the security device includes software guard extension hardware or a trusted execution engine.

Example 47. The license server of example 45, comprising the instructions to further cause the system to store the license data in a license database.

Example 48. The license server of example 45, wherein the license data includes an expiration time and the received metadata.

Example 49. The license server of example 48, further comprising a secure clock, wherein the processor is further configured determine if the license is valid based on the license server clock and the expiration time.

Example 50. The license server of example 48, wherein the metadata includes a MAC-address, IP-address, and host name of a machine operating the machine.

Example 51. The license server of example 47, wherein the processor is further configured to determine if the license is valid based on the license stored in the license database and the received metadata.

Example 52. The license server of example 51, wherein the processor is further configured to: receive a license renewal request from the machine; determine a license renewal response based on the validity of the license data stored in the license database; and send a license renewal response.

Example 53. The license server of example 52, wherein the license renewal response includes a new license.

Example 54. The license server of example 52, wherein the license renewal response includes a message indicating a license is not valid.

Example 55. A machine-controlled method for licensing an appliance, the method comprising: requesting the use of an appliance on a machine by a client; sending a first unique identifier to the license server in response to the request to use the appliance; sending a second unique identifier to the machine in response to the first unique identifier; establishing a secure channel between a machine and a license server based on the first unique identifier and the second unique identifier; requesting a license for activating the appliance from the license server; exchanging license data between the license server and the machine over the established secure channel; determining whether the license data is valid; and activating the appliance responsive to a determination that the license data is valid.

Example 56. The machine-controlled method of example 55, wherein the machine and the license server are each associated with a security device.

Example 57. The machine-controlled method of example 56, wherein each security device includes software guard extension hardware or a trusted execution engine.

Example 58. The machine-controlled method of example 55, further comprising: storing the license data in a license database associated with the license server; and storing the license data in the machine.

Example 59. The machine-controlled method of example 58, wherein the license data includes an expiration time and one of a MAC-address, IP-address, and host name of a client operating the machine.

Example 60. The machine-controlled method of example 59, further comprising deactivating the appliance if a machine time is after the expiration time.

Example 61. The machine-controlled method of example 59, further comprising halting the appliance if the license data stored in the license database does not match the license data stored in the machine.

Example 62. The machine-controlled method of example 59, further comprising removing the license data in the license database responsive to a determination that the license is invalid.

Example 63. The machine-controlled method of example 55, further comprising: requesting via the machine a license renewal after a predetermined period of time; and deactivating the appliance if the license renewal is invalid.

Example 64. At least one machine readable medium comprising a plurality of instructions that in response to being executed by a system cause the system to: request the use of an appliance on a machine by a client; send a first unique identifier to the license server in response to the request to use the appliance; send a second unique identifier to the machine in response to the first unique identifier; establish a secure channel between a machine and a license server based on the first unique identifier and the second unique identifier; request a license for activating the appliance from the license server; exchange license data between the license server and the machine over the established secure channel; determine whether the license data is valid; and activate the appliance responsive to a determination that the license data is valid.

Example 65. The at least one machine readable medium of example 64, wherein the machine and the license server are each associated with a security device.

Example 66. The at least one machine readable medium of example 65, wherein each security device includes software guard extension hardware or a trusted execution engine.

Example 67. The at least one machine readable medium of example 64, further comprising the instructions to further cause the system to: store the license data in a license database associated with the license server; and store the license data in the machine.

Example 68. The at least one machine readable medium of example 67, wherein the license data includes an expiration time and one of a MAC-address, IP-address, and host name of a client operating the machine.

Example 69. The at least one machine readable medium of example 68, further comprising the instructions to further cause the system to deactivate the appliance if a machine time is after the expiration time.

Example 70. The at least one machine readable medium of example 68, further comprising the instructions to further cause the system to halt the appliance if the license data stored in the license database does not match the license data stored in the machine.

Example 71. The at least one machine readable medium of example 64, further comprising the instructions to further cause the system to remove the license data in the license database responsive to a determination that the license is invalid.

Example 72. The at least one machine readable medium of example 64, further comprising the instructions to further cause the system to: request via the machine a license renewal after a predetermined period of time; and deactivate the appliance if the license renewal is invalid.

Example 73. A license management system, comprising: a machine with a first security device configured to generate a first unique identifier, the machine configured to receive a request for use of a license appliance; a license server with a second security device configured to generate a second unique identifier; wherein machine and the license server are configured to establish a secure channel between the machine and the license server in response to the request for use of the licensed appliance to determine if license data associated with the licensed appliance is valid.

Example 74. The license management system of example 73, wherein the security device includes software guard extension hardware or a trusted execution engine.

Example 75. The license management system of example 73, further comprising: a first memory associated with the license server, the first memory configured to store the license data in a license database associated with the license server; and a second memory associated with the machine, the second memory configured to store the license data.

Example 76. The license management system of example 75, wherein the license data includes an expiration time and one of a MAC-address, IP-address, and host name of a client operating the machine.

Example 77. The license management system of example 76, wherein the machine is configured to deactivate the appliance if a client time is after the expiration time.

Example 78. The license management system of example 76, wherein the machine is configured to halt the appliance if the license data stored in the license database does not match the license data stored in the machine.

Example 79. The license management system of example 76, wherein the license server is configured to remove the license data in the license database when the license is invalid.

Example 80. The license management system of example 73, wherein the machine is configured to request for a license renewal after a predetermined period of time and deactivate the appliance if the license renewal is invalid.

Although specific embodiments have been illustrated and described herein, it will be appreciated by those of ordinary skill in the art that a wide variety of alternate and/or equivalent implementations may be substituted for the specific embodiments shown and described without departing from the scope of the embodiments of the disclosed technology. This application is intended to cover any adaptations or variations of the embodiments illustrated and described herein. Therefore, it is manifestly intended that embodiments of the disclosed technology be limited only by the following claims and equivalents thereof.

What is claimed is:

1. A non-transitory storage device including instructions that, when executed, cause processor circuitry in a client host device to at least:
generate a first unique identifier based on first security circuitry associated with the client host device;
establish a first secure channel between the first security circuitry of the client host device and second security circuitry of a remote license server using the first unique identifier;
cause transmission of license data to the second security circuitry of the remote license server via the first secure channel, the license data corresponding to an appliance;
in response to obtaining a communication indicative of a validity of the license data from the remote license server, activate the appliance;

generate a second unique identifier based on third security circuitry of a virtual machine implemented by the client host device; and establish a second secure channel between the third security circuitry of [[a]]the virtual machine implemented by the client host device and the second security circuitry of the remote license server using the second unique identifier.

2. The non-transitory storage device of claim 1, wherein the first unique identifier is a unique data value stored in software guard extension (SGX) circuitry of the client host device.

3. The non-transitory storage device of claim 1, wherein the first unique identifier is a unique data value stored in trusted execution environment (TEE) circuitry of the client host device.

4. The non-transitory storage device of claim 1, wherein the first unique identifier is a unique data value generated using random number generation circuitry of the client host device.

5. The non-transitory storage device of claim 1, wherein the first unique identifier is a unique data value generated using secure clock circuitry associated with the client host device.

6. The non-transitory storage device of claim 1, wherein the instructions cause the processor circuitry to: establish the first secure channel by causing transmission of information representative of a unique data value generated using the license data associated with the appliance and at least one of:
 data representative of a media access control (MAC) address of the client host device;
 data representative of a client host device name of the client host device;
 data representative of a client host device IP address of the client host device; or data representative of metadata of the client host device.

7. The non-transitory storage device of claim 1, wherein the instructions cause the processor circuitry to cause transmission of at least one of the first unique identifier or the license data to the second security circuitry at a plurality of temporal intervals.

8. The non-transitory storage device of claim 1, wherein the instructions cause the processor circuitry to cause transmission of at least one of the first unique identifier or the license data the second security circuitry on an event driven basis.

9. The non-transitory storage device of claim 1, wherein the instructions cause the processor circuitry to establish the first secure channel between the first security circuitry and the second security circuitry responsive to receipt of a license request including respective license data corresponding to a plurality of appliances communicatively coupled to the client host device.

10. The non-transitory storage device of claim 1, wherein the instructions cause the processor circuitry to establish the first secure channel between the first security circuitry and the second security circuitry, responsive to receipt by the client host device of a license request including respective license data corresponding to a plurality of cloned appliances communicatively coupled to the client host device.

11. The non-transitory storage device of claim 1, wherein the instructions that the processor circuitry to establish the first secure channel between the first security circuitry and the second security circuitry, responsive to receipt of a license request including license data associated with a virtual network function hosted by the client host device.

12. A method to validate an appliance, the method comprising:
 generating, by executing an instructions with a processor on a client host device, a first unique identifier based on first security circuitry associated with the client host device;
 establishing, by executing an instruction with the processor of the client host device, a first secure channel between the first security circuitry associated with the client host device and second security circuitry associated with a remote license server using the first unique identifier;
 causing, by executing an instruction with the processor of the client host device, transmission of license data to the second security circuitry associated with the remote license server via the first secure channel, the license data associated with the appliance;
 in response to obtaining a communication indicative of a validity of the license data from the remote license server, activating, by executing an instruction with the processor of the client host device the appliance;
 generating, by executing an instruction with the processor of the client host device, a second unique identifier based on third security circuity of a virtual machine implemented by the client host device; and
 establishing, by the virtual machine, a second secure channel between the third security circuitry associated with the virtual machine and the second security circuity associated with the remote license server using the second unique identifier.

13. The method of claim 12, wherein the first unique identifier is a unique data value stored in software guard extension (SGX) circuitry associated with the client host device.

14. The method of claim 12, wherein the first unique identifier is a unique data value stored in trusted execution environment (TEE) circuitry associated with the client host device.

15. The method of claim 12, wherein the first unique identifier is a unique data value generated using random number generation circuitry associated with the client host device.

16. The method of claim 12, wherein the first unique identifier is a unique data value generated using secure clock circuitry associated with the client host device.

17. The method of claim 12, wherein the establishing of the first secure channel includes causing transmission of information representative of a unique data value generated using the license data associated with the appliance and at least one of:
 data representative of a media access control (MAC) address associated with the client host device;
 data representative of a client host device name associated with the client host device;
 data representative of a client host device IP address associated with the client host device; or
 data representative of metadata associated with the client host device.

18. The method of claim 12, further including causing transmission of at least one of the first unique identifier or the: license data from the appliance to the second security circuitry at a plurality of temporal intervals.

19. The method of claim 12, further including causing transmission of at least one of the first unique identifier or the license data associated with the appliance to the second security circuitry on an event driven basis.

20. The method of claim 12, wherein the activating of the appliance includes activating the appliance responsive to receipt by of a signature generated by the second security circuitry confirming the validity of the license data associated with the appliance.

21. A client host device to validate an appliance, the client host device comprising:
- memory;
- instructions in the client host device; and
- processor circuitry to execute the instructions to:
  - issue a first key based on first security circuitry associated with the client host device;
  - establish a first secure channel between first security circuitry associated with the client host device and second security circuitry associated with a remote license server based on the first key;
  - cause transmission of license data to the second security circuitry of the remote licensed server via the first secure channel, the license data corresponding to an appliance;
  - in response to obtaining a communication indicative of a validity of the license data from the remote license server, activate the appliance;
  - generate a second key based on third security circuity of a virtual machine implemented by the client host device; and
  - establish a second secure channel between the third security circuity of the virtual machine implemented by the client host device and the second security circuit of the remote license server using the second key.

* * * * *

UNITED STATES PATENT AND TRADEMARK OFFICE
CERTIFICATE OF CORRECTION

| | |
|---|---|
| PATENT NO. | : 11,507,643 B2 |
| APPLICATION NO. | : 16/373300 |
| DATED | : November 22, 2022 |
| INVENTOR(S) | : Bhandaru et al. |

It is certified that error appears in the above-identified patent and that said Letters Patent is hereby corrected as shown below:

In the Claims

In Claim 1, Column 15, Line 5, delete "[[a]]".

Signed and Sealed this
Thirteenth Day of February, 2024

*Katherine Kelly Vidal*

Katherine Kelly Vidal
*Director of the United States Patent and Trademark Office*